United States Patent
Greene, Jr.

(10) Patent No.: US 10,081,160 B2
(45) Date of Patent: Sep. 25, 2018

(54) MULTI-LAYERED SHAPE RETAINING ABSORBENT MATERIAL

(71) Applicant: Outtadaway, LLC, Rensselaer, IN (US)

(72) Inventor: George William Greene, Jr., Murfreesboro, TN (US)

(73) Assignee: Outtadaway, Inc., Rensselaer, IN (US)

( * ) Notice: Subject to any disclaimer, the term of this patent is extended or adjusted under 35 U.S.C. 154(b) by 324 days.

(21) Appl. No.: 14/925,236

(22) Filed: Oct. 28, 2015

(65) Prior Publication Data
US 2017/0120559 A1    May 4, 2017

(51) Int. Cl.
| | | |
|---|---|---|
| *B32B 3/24* | (2006.01) | |
| *B32B 7/12* | (2006.01) | |
| *B32B 3/26* | (2006.01) | |
| *B32B 5/02* | (2006.01) | |
| *B32B 15/04* | (2006.01) | |
| *A47G 23/02* | (2006.01) | |

(52) U.S. Cl.
CPC .............. *B32B 7/12* (2013.01); *B32B 3/266* (2013.01); *B32B 5/022* (2013.01); *B32B 15/04* (2013.01); *A47G 2023/0283* (2013.01); *A47G 2023/0291* (2013.01); *B32B 2262/062* (2013.01); *B32B 2307/304* (2013.01); *B32B 2307/726* (2013.01); *B32B 2307/7265* (2013.01); *B32B 2439/00* (2013.01)

(58) Field of Classification Search
CPC ................ A47G 2023/0283; A47G 2023/0291
USPC .................................. 428/464, 378; 426/126
See application file for complete search history.

(56) References Cited

U.S. PATENT DOCUMENTS

| | | | |
|---|---|---|---|
| 2,568,623 A | 8/1946 | Hamm | |
| 2,641,402 A | 1/1948 | Bruun | |
| 6,425,494 B1 | 7/2002 | Woods, II | |
| 7,238,403 B2 | 7/2007 | Koslow et al. | |
| 2015/0329270 A1* | 11/2015 | Chu | A47G 23/0266 220/739 |
| 2016/0286994 A1* | 10/2016 | Felty | A47G 23/0216 |

* cited by examiner

*Primary Examiner* — William P Watkins, III
(74) *Attorney, Agent, or Firm* — Eugene M. O'Donnell; Garrick T. Lankford

(57) ABSTRACT

A deformable shape retaining sheet of material is provided that can be formed around another object, such as a drinking vessel. The sheet has an absorbent layer, a shape retaining layer, and a decorative layer. The absorbent layer contacts the other object and absorbs any liquid that forms or leaks from the vessel. The shape retaining layer maintains the shape of the material to prevent it from falling away and also prevents any liquid that is present in the absorbent layer from moving to the decorative layer.

20 Claims, 5 Drawing Sheets

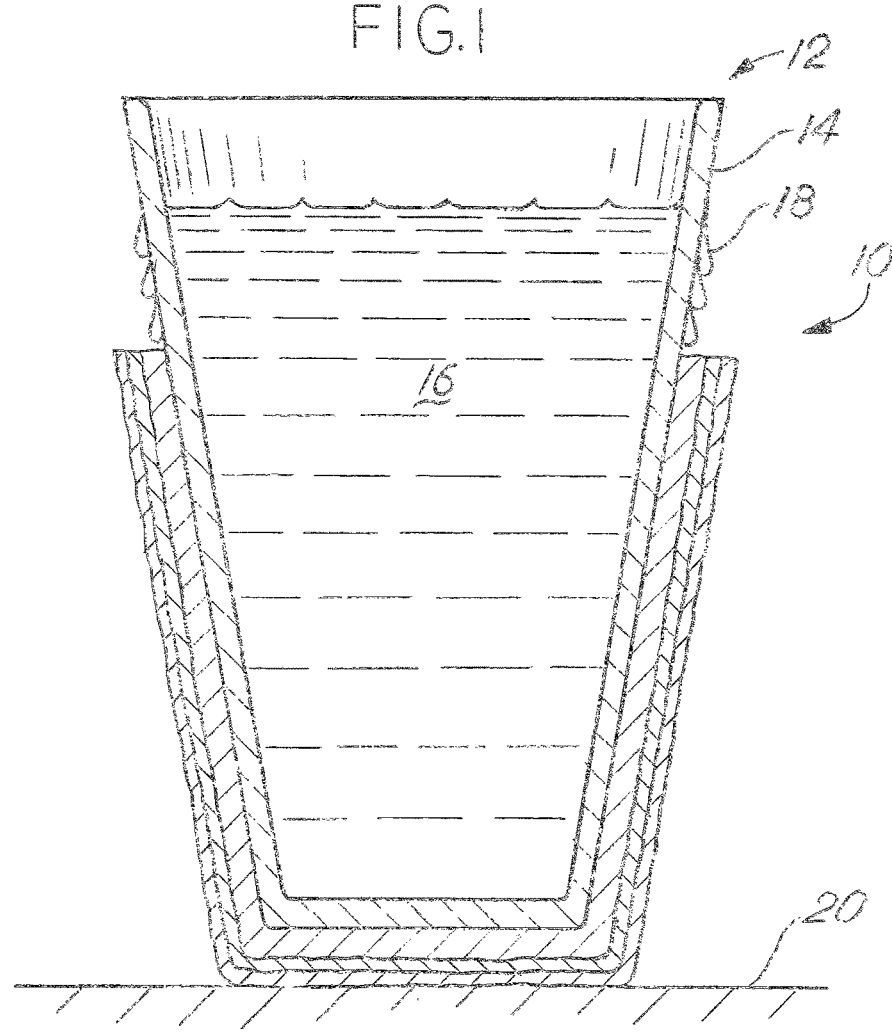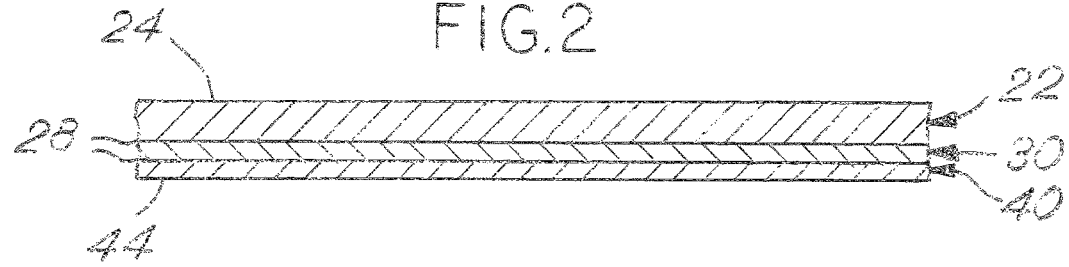

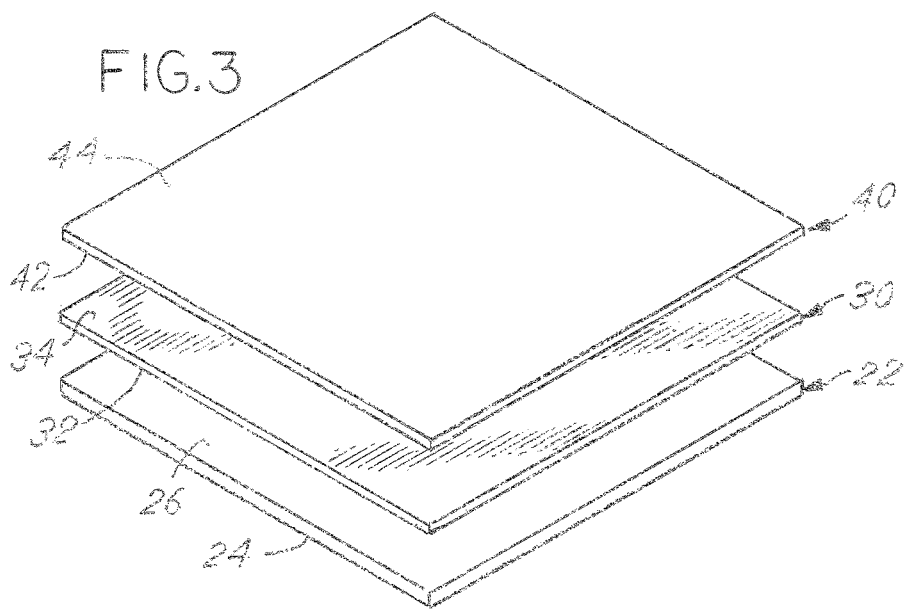
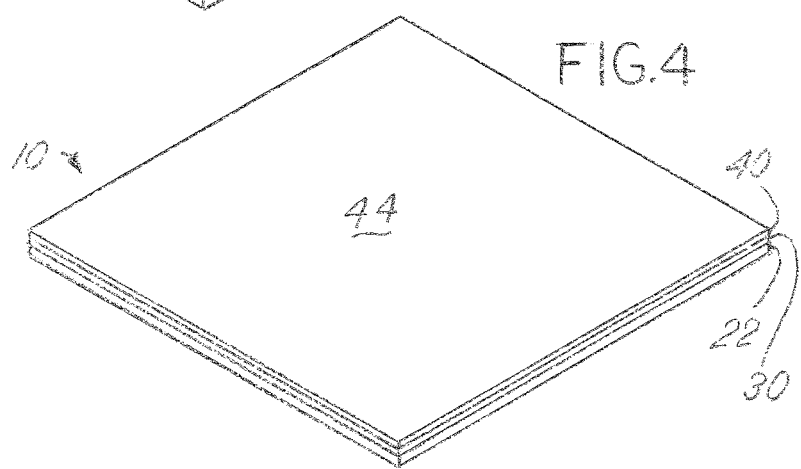
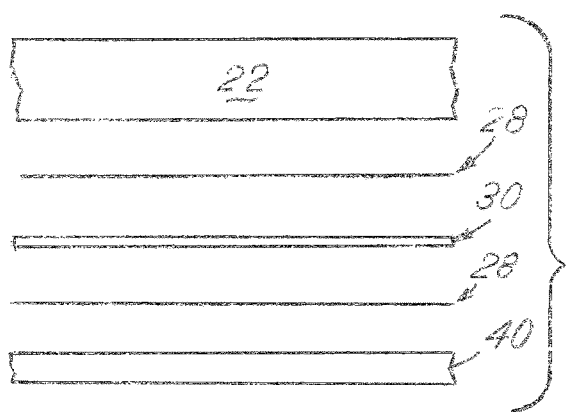

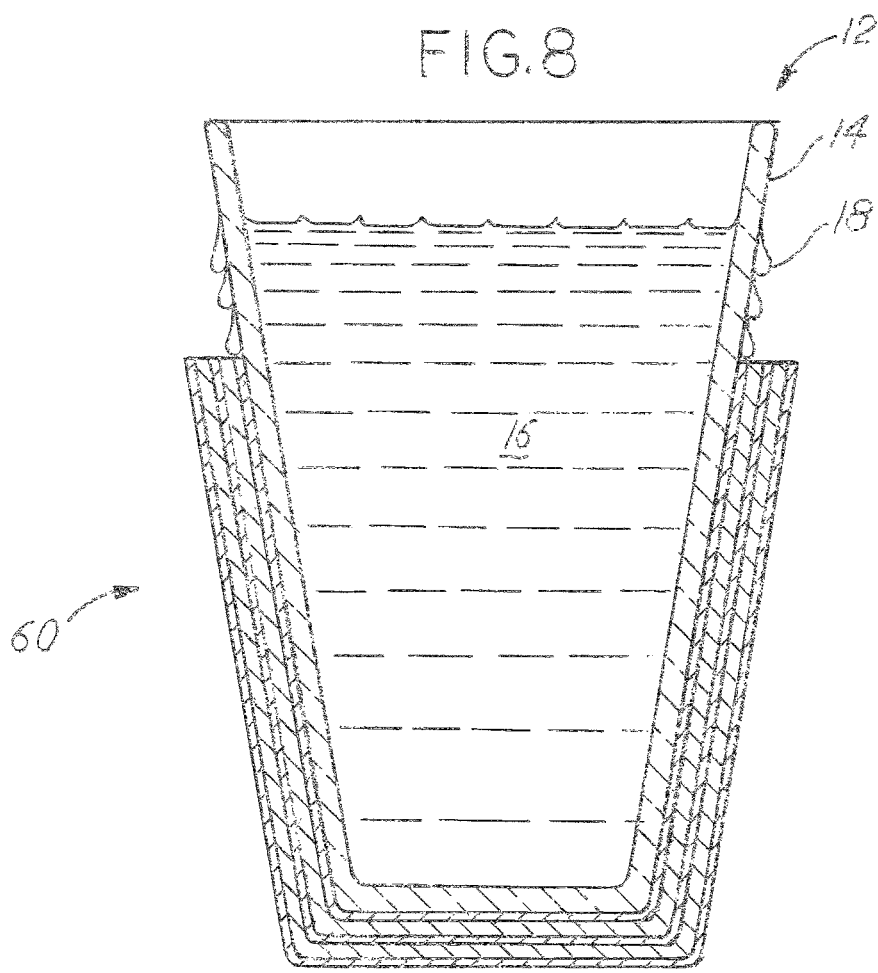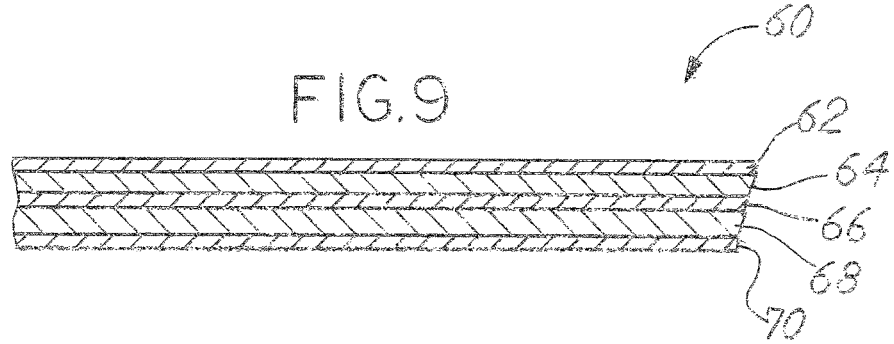

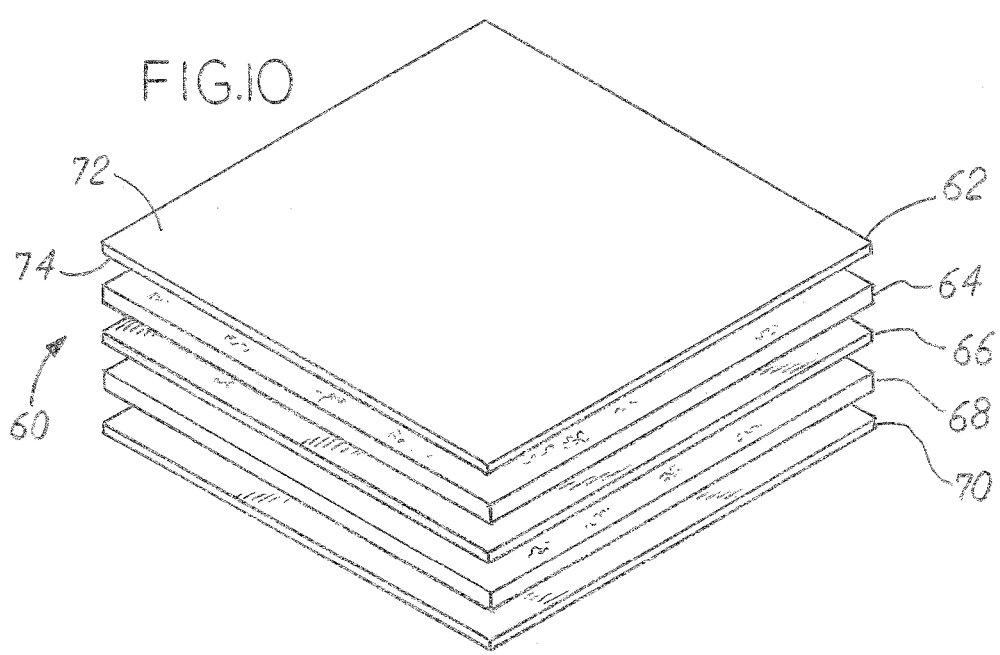
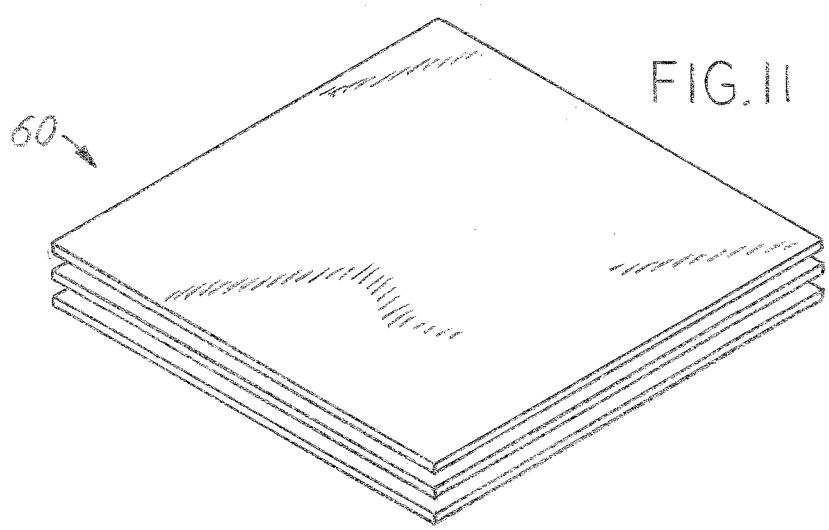

MULTI-LAYERED SHAPE RETAINING ABSORBENT MATERIAL

BACKGROUND OF THE INVENTION

This present disclosure relates to devices for absorbing moisture from a drinking vessel, especially condensation that commonly forms on a cold drink on a humid day. Condensation can accumulate on the cold outer surface of glass where it can run down onto the surface the glass is sitting. This can cause damage to many surfaces, stain clothing, and at the very least, leave a wet area or mark. Coasters and other drink insulators exist for both hot and cold drinks, but they either require a resilient portion to grip the vessel, or are a standalone coaster that does not travel with the drink, leaving the user to sit the glass down elsewhere, and without a coaster. Other drink covers do nothing to manage and contain condensation as it forms. Further, drink covers and coasters are ill adapted to be used with a variety of vessels, as they frequently fail to absorb any condensation that forms. An improved drink cover is needed.

SUMMARY OF THE INVENTION

The present disclosure describes a formable drink cover having a flexible absorbent layer, a formable layer that holds its formed shape, and an optional decorative layer. The three layers are bonded together, with the formable layer located and sandwiched between the absorbent and decorative layer. The cover is applied by the user molding the cover around the outside shape of the drinking vessel, where it retains the molded shape. This puts the absorbent layer in direct contact with the outside surface of the vessel. The formable layer is impermeable, so that even a fully saturated absorbent layer does not result in any moisture on the decorative layer. The absorbent layer may be adapted to be decorative and insulative; the decorative and insulative layer may be adapted to be absorbent, allowing the drink cover to be reversible.

BRIEF DESCRIPTION OF THE DRAWINGS

A preferred embodiment of this invention has been chosen wherein:

FIG. 1 is the material as installed on a drinking cup;

FIG. 2 is a side view of the material;

FIG. 3 is an exploded isometric view showing the layers of the material;

FIG. 4 is an isometric view of the material;

FIG. 5 a side view of the material having an adhesive sheet;

FIG. 8 is an alternate embodiment of the material as installed on a drinking cup;

FIG. 9 is a side view of the alternate embodiment;

FIG. 10 is an exploded isometric view of the alternate embodiment; and

FIG. 11 is an isometric view of the alternate embodiment.

DESCRIPTION OF THE PREFERRED EMBODIMENT

Figure 6:
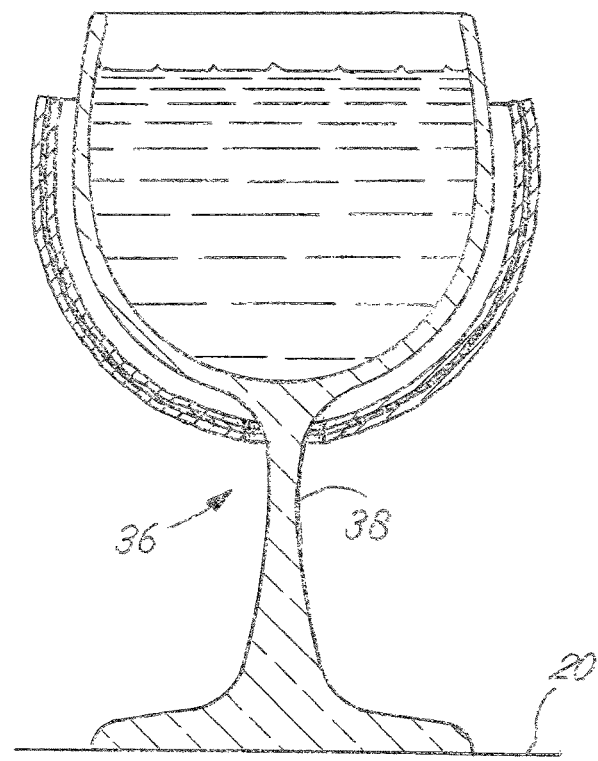
FIG. 6 is the material as installed on a drinking vessel having a stem.

The material 10 as shown in FIG. 1 is installed on a drinking cup 12. The cup 12 has an outer surface 14 and contains a liquid 16. The cup 12 and outer surface 14 can be colder than the environment, forming condensation 18. As condensation 18 accumulates, it can then run down the outer surface 14, toward the resting surface 20. The material 10 forms an absorbent barrier between the outer surface 14 and the resting surface 20. As shown in FIGS. 2 through 4, the material 10 is comprised of layers. Each layer serves a specific purpose.

As is shown in FIG. 3, the absorbent layer 22 is made from a sheet of absorbent material with an exposed absorbing side 24 and an inner attaching side 26. The absorbent layer 22 is porous and capable of absorbing and retaining moisture. It is flexible and can be formed into various shapes. When water or other liquids contact the absorbent layer 22, it wicks the liquid into the layer. The material can be formed from a randomly oriented pulp, woven fabric, or other material that will readily absorb liquid. The distance between the absorbing side 24 and attaching side 26 define the thickness of the absorbent layer 22. As is known in the art, a thicker absorbent layer will hold more moisture. The absorbent layer 22 can also contain additives or fillers that are specifically designed to absorb and retain moisture. The absorbing side 24 will readily receive any liquid, pulling it into the thickness of the absorbent layer 22. The absorbent layer 22 is contemplated to be a single layer or be made from several individual layers of absorbent material.

The decorative layer 40 is made from a sheet of material having insulative properties. It has an inside surface 42 and an exposed decorative surface 44. The decorative layer can have printing, embossing, or include other designs to add a specific look to the material 10. As with the absorbent layer 22, the decorative layer 40 is flexible and can be formed into various shapes. The decorative layer 40 has a thickness defined by the distance between the inside surface 42 and the decorative surface 44. The decorative layer 40 may be made from a single layer or be made from several individual layers of decorative and/or insulative materials.

The shape retaining layer 30 is made from a sheet of material with formable properties. The shape retaining layer 30 may start out as a flat sheet, but once it is formed into a different shape, it retains most, if not all, of the formed shape. The shape retaining layer 30 has a first side 32 and a second side 34. The shape retaining layer 30, specifically the first side 32 overlays the attaching side 26. As shown in FIGS. 2 and 4, the first side 32 is adhered to and directly contacts attaching side 26. The second side 34 is adhered to and directly contacts the inside surface 42. The distance between the first side 32 and second side 34 define the thickness of the shape retaining layer 30. The shape retaining layer is also made from a material that is impervious to fluid transfer from the first side 32 to the second side 34. It is further contemplated that the shape retaining layer 30 allows a small portion of fluid to transfer from the first side 32 to the second side. Examples of shape retaining material include but are not limited to metallic foil, polymers, formable mesh, and various combinations of those materials. It is also possible that the shape retaining layer 30 allows fluid transfer but has an additional layer in direct contact that is impervious or substantially impervious to fluid transfer through the shape retaining layer 30 and additional layer.

Figure 7:
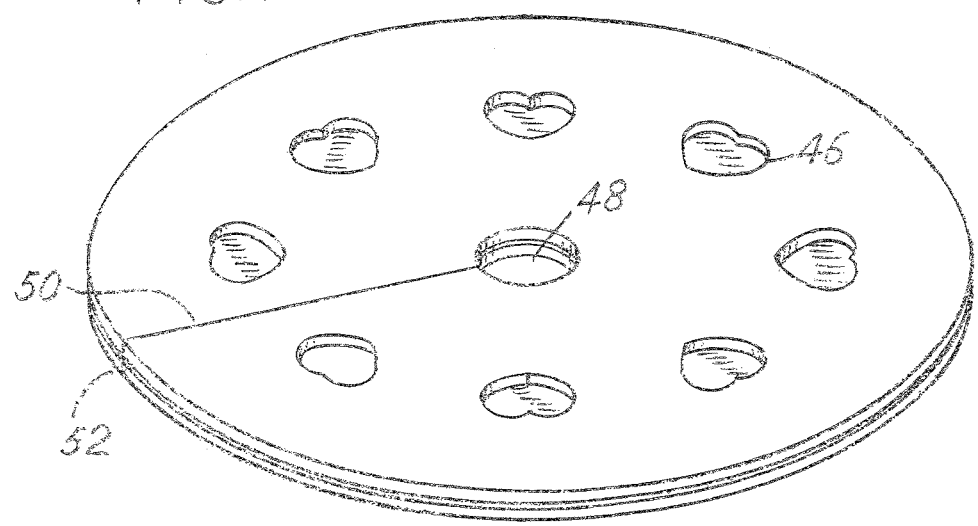
FIG. 7 is an isometric view of the material as adapted for use with the drinking vessel in FIG. 6.

The material 10 can be formed and adapted to work with a variety of drinking vessels. As is shown in FIG. 6, a wine glass 36 having a stem 38 requires a different shape. For the wine glass 36, the stem 38 creates a technical challenge that is overcome by adding a hole 48 in the center with a slit 50 that extends between the hole 48 to an outside perimeter 52. As is shown in FIG. 7, the decorative layer 40 can further include apertures 46 that reveal portions of the second side 34 of the shape retaining layer 30.

The three layers 22, 30, 40 overlay each other as shown in FIGS. 2 and 3, with the absorbent layer 22 on one side, the shape retaining layer 30 directly overlaying it, and the decorative layer 40 overlaying the shape retaining layer 30. The three layers are affixed on their respective overlaying surfaces, either through adhesive 28 or mechanical interlocking. Mechanical interlocking can be through stippling, similar to the method that is frequently used with existing multi-layer absorbent materials. Mechanical interlocking is well known in the art.

When the layers are secured with adhesive 28, the adhesive 28 is located between adjacent layers. The adhesive 28 can be applied in sheet form, sprayed, rolled, or other means. In FIG. 5, the adhesive 28 is shown as a sheet located between the shape retaining layer 30 and the absorbent layer 22 and the decorative layer 40. The adhesive 28 maintains the bond of the shape retaining layer 30 and the layer that directly contacts it. As the shape retaining layer 30 is deformed, the adhesive 28 keeps the contacting layer from separating away from the shape retaining layer 30. When the adhesive is located between the first side 32 and the attaching side 26 of the absorbent layer 22, it can penetrate through the attaching side 26 and into the absorbent layer 22, but it cannot significantly degrade the absorbent qualities of the absorbent layer 22. When the adhesive 28 is located between the second side 34 and the inside surface 42 of the decorative layer 40, it can penetrate partially into the decorative layer 40, but it cannot significantly degrade the insulative properties of the decorative layer 40. As described, the adhesive is a continuous layer but it is contemplated that the adhesive is selectively applied to attach adjacent layers. If mechanical interlocking is used to adheredly secure the layers, the shape retaining layer 30 retains its ability to be fluid impervious.

An alternative embodiment as shown in FIGS. 8-11 is a reversible material 60. The reversible material 60 has the same layers as the first embodiment, but includes an extra layer on each side of the shape retaining layer 66. There is an upper decorative layer 62, an upper absorbent layer 64, a shape retaining layer 66, a lower absorbent layer 68, and a lower decorative layer 70.

The upper decorative layer 62 has an upper surface 72 and a lower surface 74. The upper surface 72 can be decorative with a printed pattern or a coating. The upper decorative layer is fluid transmissive. The shape retaining layer 66 has the same shape retaining and impervious properties as shape retaining layer 30.

Further it is contemplated that an activating adhesive is applied to the exposed decorative surface 44, the upper surface 72, or the outer surface of the lower decorative layer 70. When the material 10 or reversible material 60 is folded around a cup 12, portions of the material will overlap and be folded over. In the event the cup 12 is tapered as is shown in FIGS. 1 and 8, it is possible for the material to fall away from the cup 12. The adhesive allows the material 10 or reversible material 60 to stick to itself in any areas where the material would overlap itself.

To make the material 10 as shown in FIGS. 4, 7, and 11, the layers are attached and then typically rolled for storage or transportation. Later in the process, the layers are then stamped into the final flat shape and packed for transportation to the final user.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A sheet material for covering objects having:
    a first layer being flexible and having an exposed surface and an oppositely located inner surface, said first layer having absorbent properties adapted to absorb a liquid when said liquid contacts said exposed surface;
    a deformable shape retaining second layer being centrally located and having a first surface and an oppositely located second surface, said second layer adapted to be formed to a shape and substantially retain said shape, said second layer being substantially impervious to fluid;
    a third layer being flexible and having an exposed surface and an oppositely located inner surface, said third layer having insulative properties, said exposed surface adapted to receive a decorative coating;
    a first adhesive adhering said inner surface of said first layer to said first surface, said adhesive partially penetrating said first layer and substantially preserving said absorbent properties; and
    a second adhesive adhering said inner surface of said third layer to said second surface, said adhesive partially penetrating said third layer and substantially preserving said insulative properties.

2. The sheet material of claim 1, wherein said first layer comprises a non-woven fibrous layer and said shape is delimited by a drinking vessel of a plurality of drinking vessels to which said sheet material is applied and said shape is substantially retained after said drinking vessel is removed.

3. The sheet material of claim 2, said first layer comprises a cellulose based material.

4. The sheet material of claim 1, said central layer is a metal foil.

5. The sheet material of claim 4, said third layer includes apertures revealing said second layer.

6. The sheet material of claim 1, said sheet material having a perimeter defining an area, said sheet having an aperture located central to said perimeter extending through all layers of said sheet material, said sheet further including a slit through all layers extending from said aperture to said perimeter, said slit and said aperture adapting said sheet material to be formed around a vessel having a stem.

7. The sheet material of claim 1, and a fourth layer having an inner surface and an outer surface, said inner surface of said fourth layer overlaying and adheredly contacting said exposed surface of said first layer, said fourth layer adapted to communicate said liquid from said outer surface of said fourth layer to said first layer.

8. The sheet material of claim 7, a fifth layer being disposed between said third layer and said second surface of said deformable shape retaining second layer, said fifth layer having absorbent properties.

9. The sheet material of claim 1, said third layer having a first and a second surface, said first surface separated from said second surface to define a thickness which is sufficient to absorb a pre-determined volume of condensation.

10. The sheet material of claim 1, said first layer having a first and a second surface, said first surface separated from said second surface to define a thickness.

11. The sheet material of claim 1, said exposed surface of said first layer having tacky coating wherein a portion of said exposed surface will adhere to an adjacent portion of said exposed surface when said portion contacts said adjacent portion.

12. The sheet material of claim 1, said exposed surface of said third layer having tacky coating wherein a portion of said exposed surface will adhere to an adjacent portion of said exposed surface when said portion contacts said adjacent portion.

13. The sheet material of claim 1, said first adhesive being a sheet of material having a tacky surface on each side for adhering said first layer to said second layer, said second adhesive being a sheet of material having a tacky surface on each side for adhering said third layer to said second layer.

14. The sheet material of claim 1, said third layer having apertures through said third layer to expose a portion of said second layer.

15. The sheet material of claim 1, said first layer having absorbent properties in addition to said insulative properties, said third layer having insulative properties in addition to said absorbent properties.

16. A sheet material for covering objects having:
   a first layer being flexible and having an exposed surface, said first layer having absorbent properties adapted to absorb a liquid when said liquid contacts said exposed surface;
   a deformable shape retaining second layer being centrally located and having a first surface and a second surface, said second layer adapted to be formed to a shape and substantially retain said shape, said second layer being substantially impervious to fluid;
   a third layer being flexible and having an exposed surface adapted to receive a decorative coating, said third layer overlaying and contacting said second layer opposite said first layer;
   a first adhesive adhering said first layer to said first surface, said adhesive partially penetrating said first layer and substantially preserving said absorbent properties; and
   a second adhesive adhering said third layer to said second surface, said adhesive partially penetrating said third layer and substantially preserving said insulative properties.

17. The sheet material of claim 16, and a fourth layer having an inner surface and an outer surface, said inner surface of said fourth layer overlaying and adheredly contacting said exposed surface of said first layer, said fourth layer adapted to communicate said liquid from said outer surface to said first layer.

18. The sheet material of claim 17, a fifth layer being disposed between said third layer and said second surface, said fifth layer having insulative properties.

19. The sheet material of claim 16, said third layer having a first and a second surface, said first surface separated from said second surface to define a thickness, said first and second adhesive being a sheet of material having a tacky surface on each side.

20. The sheet material of claim 16, said first layer having insulative properties in addition to said absorbent properties, said third layer having absorbent properties in addition to said insulative properties which is sufficient to absorb a pre-determined volume of condensation.

* * * * *